United States Patent [19]

Reder-James et al.

[11] 4,125,369

[45] Nov. 14, 1978

[54] PERMANENT TOPICAL TEXTILE ANTISTATS

[75] Inventors: Brenda J. Reder-James, Inglewood, Calif.; Sally P. Ginter, Sanford, Mich.

[73] Assignee: The Dow Chemical Company, Midland, Mich.

[21] Appl. No.: 781,826

[22] Filed: Mar. 28, 1977

[51] Int. Cl.$^2$ .................... C08L 61/28; D06M 15/56
[52] U.S. Cl. .................... 8/115.6; 260/849; 427/385 B; 427/386; 427/390 A; 427/390 B
[58] Field of Search .................... 260/849, 67.6 R; 8/115.6

[56] References Cited

U.S. PATENT DOCUMENTS

| B 444,078 | 3/1976 | Stevens et al. ................ 260/47 EQ |
| 2,131,142 | 9/1938 | Orthner et al. ................ 260/482 |
| 3,551,152 | 12/1970 | Mackey et al. ................ 260/85 |
| 3,936,422 | 2/1976 | Wirth et al. ................ 260/45.95 N |

FOREIGN PATENT DOCUMENTS

1,267,259  3/1972  United Kingdom.

OTHER PUBLICATIONS

Clark; American Dyestuff Reporter, 1967 (Feb. 27) pp.37–43.

*Primary Examiner*—John C. Bleutge
*Attorney, Agent, or Firm*—David H. Fifield

[57] ABSTRACT

Improved antistatic compositions for topical application to textiles, which comprise:

(a) a polymer of less than about 20,000 molecular weight consisting essentially of, in polymerized form, about 10 to 99 mole percent alkylene oxide, of 2 to 4 carbon atoms, about 1 to 90 mole percent glycidol and about 0 to 15 mole percent of the glycidyl ester of a fatty acid of about 2 to 20 carbon atoms and about 0 to 15 mole percent of the glycidyl monoester of a polycarboxylic acid, (b) a melamine-formaldehyde curing agent capable of cross-linking the polymer by reaction with the primary hydroxyl groups of the glycidol units, in the amount of about 15 weight percent to about 25 weight percent based on component (a), and (c) a sulfonic acid catalyst for the curing reaction, in the amount of about 1.2–2.2 weight percent based on component (a).

13 Claims, No Drawings

PERMANENT TOPICAL TEXTILE ANTISTATS

BACKGROUND OF THE INVENTION

Textiles containing polyacrylic, polyester or polyamide fibers and films of such thermoplastics are prone to develop objectionable static electric charges. An excellent general review of various antistatic compositions and processes for ameliorating the static problem is that of John E. Clark, *Am. Dyestuff Reporter*, Feb. 27, 1967, pp. 37–43.

Topical antistats, i.e., those designed for surface application to reduce static charge build-up, have been unsatisfactory for use on textiles because of defects such as lack of permanence, increased soiling, unpleasant hand (greasy feel, harshness, etc.), or undesirable appearance or odor, etc. Desirably, such antistats should be such that they can be applied from an aqueous medium and then rendered wash-resistant by a simple after-treatment. They should not impart odor, color, greasiness, unpleasant hand, dullness or other undesirable property to the substrate nor adversely affect its normal utility.

CROSS-REFERENCE TO RELATED APPLICATIONS

Copending application, Ser. No. 466,099, filed May 2, 1974, and U.S. Pat. No. 4,014,854, of Stevens et al., disclose polymers suitable for use in the present invention and methods for making such polymers. For such disclosure, they are hereby incorporated herein by reference. Copending application Ser. No. 678,574, filed Apr. 20, 1976, discloses antistatic compositions generically related to the instant invention.

SUMMARY OF THE INVENTION

The improved antistatic composition of the invention comprises:

(a) a polymer of less than about 20,000 molecular weight consisting essentially of units of the formula:

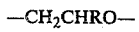

—CH$_2$CHRO— wherein about 10 to 99 percent, preferably about 50 to 95 percent of the units, R is H, CH$_3$ or C$_2$H$_5$, in about 1 to 90 percent, preferably about 5 to 50 percent, R is CH$_2$OH, and in about 0 to 15 percent, preferably about 1 to 5 percent, R is R'COOCH$_2$ wherein R'CO is the acyl group of a fatty acid of about 2 to 20, and preferably about 8 to 18, carbon atoms or of a polycarboxylic acid, (b) a melamine-formaldehyde curing agent for said polymer that is capable of cross-linking the polymer; and (c) a sulfonic acid catalyst that catalyzes the reaction between the polymer and the curing agent, wherein (b) is present in an amount of about 15 to about 25 percent and (c) is present in an amount of about 1.2–2.2 percent based on the weight of component (a).

The present improved antistatic composition shows a surprisingly superior combination of (1) static charge reduction; (2) wash durability; (3) soft handle; (4) rapid curing; and (5) low soiling on carpet fabric when compared to the generic composition of related application Ser. No. 678,574. These improvements in performance are completely unexpected and are very important to any commercial textile "antistat" which must reduce static charge in a durable fashion, after repeated washings without imparting a stiff, harsh or greasy feel to the textile and still avoid increasing the tendency of the textile to soil. The improvement in antisoiling properties over the compositions of Ser. No. 678,574 are especially striking.

As is apparent from the above formula, the preferred polymer is a copolymer of alkylene oxide, glycidol and a glycidyl ester of a fatty acid or polycarboxylic acid, though the glycidyl ester moieties are not essential. The preferred polymer is of about 500 to about 20,000 and most preferably about 3,000 to about 7,000 weight average molecular weight. One preferred embodiment has about 90 mole percent ethylene oxide and about 10 mole percent glycidol units. Another preferred embodiment contains no glycidyl ester units. Also preferred is a polymer wherein an average of about 1 to about 2 glycidyl ester moieties are present for about each 5,000 unit of molecular weight. Above about 20,000 molecular weight, the polymers are extremely difficult to handle and to dealkylate unless a solvent is employed and become impractical for use herein.

The curing agent is one that is capable of cross-linking the polymer by reaction with the hydroxyl groups of the glycidol units. Such agents are well known melamine-formaldehyde condensates. The curing agent is employed in the amount of about 15 to about 25 percent based on the weight of the polymer component, preferably about 17 to about 22 percent. Below about 15 percent curing agent, the treated textile fabric exhibits a greatly increased tendency to soil. Suitable curing agents for the instant antistatic composition are Cymel brand melamine-formaldehyde resins marketed by American Cyanamid Co. Examples of suitable curing agents are Cymel 303, 370, 373 and 380 brand resins. Preferably, a water-soluble, polymeric melamine-formaldehyde condensate such as Cymel 380 brand resin is employed.

The sulfonic acid catalyst for the curing reaction is suitably any of the common organosulfonic acids such as toluenesulfonic acid, benzenesulfonic acid, Turkey red oil and other sulfonated fatty acid esters, sulfosalicyclic acid, and the like. Preferably the catalyst is an aromatic sulfonic acid, especially toluenesulfonic or benzenesulfonic acid. The acid catalyst is present in a minimum amount of about 1.2, preferably 1.4, up to a maximum amount of about 2.2, preferably 2.0 percent, based on the weight of the polymer component mentioned above. Most preferably, the acid catalyst is present in the amount of about 1.6 to 1.8 percent.

In some instances, the textile fabric to be treated with the composition of the invention may have been subjected to a basic dye bath and not subsequently treated to remove residual basicity. In such instances, the textile should first be neutralized before adding the catalytic amount of sulfonic acid or else a portion of the sulfonic acid will be consumed in neutralization of the residual base and curing will not be complete or will be greatly retarded.

The invention composition is conveniently applied to textile materials from an aqueous dispersion, the treated material is dried and the surface coating thus produced is then cured by a brief heat treatment. This fixes the composition on the fiber so that it is resistant to removal by normal wear, laundering, dry-cleaning and the like.

A major advantage of this improved composition is that many of the polymers used in the composition are water-soluble or sufficiently surface-active to be self-emulsifying in water, thus eliminating need for a separate surfactant. A related advantage is that the composition in the form of an aqueous solution or emulsion can be applied to only one side of a textile product, such as cloth or carpet, and will penetrate through the textile, thus becoming effectively distributed to the opposite side and to the individual fibers or threads constituting the textile product.

DETAILED DESCRIPTION OF THE INVENTION

While it is possible to apply the antistatic composition of the invention to textile materials in the form of a solution or dispersion in an organic solvent, it is far more practical to avoid the use of such solvents and to use aqueous solutions or dispersions instead. The concentration can be varied widely, depending largely on the nature of the textile material to be treated and the weight pick-up desired on the textile material. In a preferred application, such as on carpet made of synthetic fibers, such solutions or dispersions may suitably contain about 5 to 50 weight percent of the antistatic composition (total solids basis). While in most instances, the polymer component is adequately water-soluble or self-dispersing, conventional dispersing and emulsifying agents may also be used if desired.

The curing agent should be one that is unreactive in the composition under normal conditions but becomes reactive when the treated textile material is dried and subjected to a curing treatment. Such treatment may consist of heating to an elevated temperature. The amount of melamine-formaldehyde curing agent used should be adjusted to produce the desired degree of cross-linkage. Too little produces an inadequately cured product which may be sensitive to water or drycleaning solvents, may have a greasy handle and soil badly, while too much may cause a harsh handle or excessive stiffness or brittleness of the fiber itself or the coating thereon and reduce the conductivity thereof. It is therefore critical that the quantity of curing agent be carefully maintained within the quantities previously described and that the catalyst also be carefully maintained at the prescribed level.

The antistat composition is prepared by simply mechanically dispersing the ingredients in a fluid medium, preferably water.

The composition may be applied to textile materials in any convenient manner, such as by padding, dipping, spraying, etc. The "pick-up" or amount of solids thus deposited on the substrate will depend primarily on the concentration of solids in the treating composition and the amount of composition applied. When the application is by dipping or spraying, any excess can be squeezed out by squeeze-rolls or the like. The treated material may be dried at normal room temperature and then cured by heating or, advantageously, the drying and curing steps may be combined by passing the wet material into a heated space wherein the water or other fluid is evaporated and the composition is cured by the heat treatment. Suitable temperatures and times will vary, depending on the particular materials being processed. For example, nylon carpet typically may be dried and cured at 105° C. in about 5 to 20 minutes or at 200° C. in 4 to 8 minutes. Light fabrics require much less time.

The copolymers of alkylene oxide, glycidol and glycidyl ester can be made by copolymerizing the monomers by the usual methods of copolymerizing alkylene oxides and substituted alkylene oxides, including glycidyl compounds. This method requires glycidol as a starting material, however, and this monomer is expensive and not readily available. Moreover, its primary hydroxyl group enters into the polymerization, thus leading to undesirable and excessive branching in the product.

Another procedure for making the copolymers is that of copolymerizing alkylene oxide with a silicon ester of glycidol (U.S. Pat. No. 3,446,757) or with epichlorohydrin (U.S. Pat. Nos. 3,578,719; 3,595,924 and 3,666,671), hydrolyzing the copolymer, thus indirectly producing a linear copolymer of alkylene oxide and glycidol, and then partially esterifying the copolymer with the desired fatty acid.

A preferred procedure is that disclosed in the copending applications cited above, wherein alkylene oxide is copolymerized with tert.-butyl glycidyl ether, thus producing an essentially linear copolymer. The tert.-butyl groups are then removed and, to the desired extent, replaced with acyl groups, thus producing the desired copolymer for use in the present invention. The one-step removal of tert.-butyl groups and partial esterification of the resultant glycidol units is effected by heating a mixture of the polymeric ether, the appropriate amount of acid or anhydride and an acid catalyst, preferably an organosulfonic acid, such as toluene sulfonic acid. Isobutylene and water are by-products and can be collected and used to monitor the progress of the reaction. The removal of tert.-butyl groups is usually substantially complete by the time the desired degree of esterification has been effected. The acid used for esterification may be a single species or a mixture of two or more species, and may be saturated or unsaturated.

While the above discussion refers to certain copolymers as being linear, it should be understood that this refers to the configuration of the polyoxyalkylene chain of units of the formula:

—CH$_2$CHRO— and not necessarily to the entire molecule. It is conventional to use initiators or starter compounds in such polymerizations. These are compounds having one or more active hydrogen atoms, i.e., atoms that are reactive with alkylene oxides. Typical initiators include alcohols, glycols, glycerols, sorbitols, phenols, carboxylic acids, primary and secondary amines, ammonia and water. Those having more than two active hydrogen atoms inherently produce branched molecules, one branch arising at the site of each active hydrogen atom in excess of two. Thus, initiators having only one active hydrogen atom, such as monohydric alcohols and phenols, produce straight-chain polymers terminated on one end with a hydroxyl group, those having two active hydrogen atoms produce straight-chain polymers terminated on both ends with hydroxyl groups, and those having three or more active hydrogen atoms produce branched polymers, each branch being a straight-chain terminated on the distal end with a hydroxyl group. In making the polymers for use in the present invention, any or all of the terminal hydroxyl groups may be esterified with acids as herein described. Preferred initiators are glycols, p-phenylphenol, para-t-butylphenol, bisphenol A, water and 2-ethylhexanol.

Another preferred mode incorporates a carboxylated styrene latex of about 300 Angstroms particle size, in an amount of about 15 to 30 percent based on the polymer (a), in the composition of the invention before it is cured on the textile. Addition of this latex improves the antisoiling properties of the treated textile. Such a latex is Dow Experimental Latex XD8859 marketed by The Dow Chemical Company.

SPECIFIC EMBODIMENTS

An ethylene oxide/t-butyl glycidyl ether (TBGE) random copolymer is prepared by condensing EO and TBGE in a 9:1 molar ratio using water as initiator and a KOH catalyst. The copolymer has about a 5,000 molecular weight. This copolymer is dealkylated by heating with a catalytic amount of p-toluenesulfonic acid at about 130° C. to give an EO/glycidol copolymer of about 4,500 molecular weight, hereafter Polymer A. The same copolymer is also dealkylated and simultaneously esterified by adding an equimolar quantity of stearic acid to the dealkylation reaction. The esterified product, with about one ester group per molecule, is hereafter referred to as Polymer A monostearate.

Similarly, 9:1 EO/TBGE mixtures are initiated on p-phenylphenol and on para-t-butylphenol to give copolymers of about 5,000 molecular weights. These are also dealkylated in the manner described above and are hereafter referred to as Polymer B and Polymer C.

The Polymer A, and its respective monostearate, and Polymers B, and C are evaluated for conductivity, for durability of conductivity after washing and for soiling when applied to shag-plush (also referred to as Saxony) carpet while the amount of melamine-formaldehyde curing agent or sulfonic acid catalyst is varied.

From the dealkylation/esterification process, about 1.5 weight percent sulfonic acid is commonly present in the polymers and more is added or some neutralized, as may be appropriate, to obtain the desired quantity of sulfonic acid catalyst based on the weight of polymer. Compositions of polymer, sulfonic acid catalyst and curing agent are formulated by merely mixing the polymer, containing the appropriate amount of sulfonic acid catalyst, with water at about a 20 percent (weight) solids level. The proper amount of melamine-formaldehyde condensate is then added simply by mixing an isobutanol or isopropanol solution of the condensate with the aqueous polymer solution. Alternatively, the polymer and curing agent are mixed then a suitable amount of water is added to this mixture.

This aqueous solution of the polymer, curing agent, catalyst composition is applied to a carpet sample by spraying on at a rate sufficient to attain about 0.1 to about 0.3 oz/yd$^2$ (about 3.4 to about 10.2 g/m$^2$) add-on of the polymer to the carpet. To induce drying and curing, the treated carpet is heated at about 150° C. for about 7 minutes in a circulating air oven.

The treated carpet samples are tested for static voltage buildup by conditioning for a minimum of 48 hours at 20 percent relative humidity and about 20° C., then performing a "stroll" test where a tester holds a hand probe which is connected to a voltage indicator while walking on the carpet sample, wearing shoes having Neolite brand vinyl heels and oak tanned leather soles, for approximately 60 steps. The static charge buildup at that time is then recorded.

To assess durability of the antistatic composition, treated carpet samples are "stroll" tested for charge buildup and then a series of washes are carried out and after each wash the samples are again "stroll" tested for charge buildup. Each wash consists of hand scrubbing the sample with an aqueous surfactant solution, removing all the surfactant and then oven drying before subsequently "stroll" testing. A durability rating is assigned by the number of washings carried out before a voltage of 3,000 is surpassed in the "stroll" testing.

To assess the tendency of treated carpet samples to soil, a treated and an untreated carpet (control) sample are uniformly exposed to heavy traffic which carries both oily and greasy soil onto the samples as well as normal dust and dirt. The samples are then vacuumed and visually inspected. The soiling of the treated sample is then rated against the soiling of the control according to the following scale:

+2 — Moderately Better Than Control
+1 — Slightly Better Than Control
0 — Equivalent
−1 — Slightly Worse Than Control
−2 — Moderately Worse Than Control
−3 — Much Worse Than Control
−4 — Extremely Worse Than Control An average of ratings by 6 different persons is taken to minimize personal bias.

Performance in the above-described tests for a variety of antistatic compositions, both within and without the scope of the invention, is evaluated and reported in the following Examples and Tables.

EXAMPLE 1. EFFECT OF CURING AGENT LEVEL

Samples of a nylon shag-plush carpet of 30 oz/yd$^2$ (1,020 g/m$^2$) face weight are treated with aqueous solutions of Polymer A monostearate with Cymel 380 brand resin as curing agent in which the quantity of curing agent varies. An add-on level of about 0.2 oz/yd$^2$ (about 6.8 g/m$^2$) of Polymer A monostearate is maintained for each sample, and about 1.6 percent of p-toluenesulfonic acid is present in Polymer A monostearate. The solution is cured on the samples by heating at about 150° C. for about 7 minutes.

Similarly, samples are treated with Polymer B and Polymer C aqueous solutions, about 1.6 percent p-toluenesulfonic acid present in the polymers, with about 17.5 percent Cymel 380 brand resin and likewise cured.

The effect of varying the level of curing agent is shown in the following Table I.

TABLE I

| | | Effect of Curing Agent Level | |
|---|---|---|---|
| Sample | Wt. Percent Curing Agent* | Voltage at 20% R.H. | Soiling |
| Control | — | | — |
| Polymer A monostearate | 5 | 400 | −4 |
| " | 10 | 650 | −4 |
| " | 15 | 890 | −1 |
| " | 17.5 | 1,120 | 0 |
| " | 20 | 1,300 | 0 |
| Polymer B | 17.5 | 2,000 | 0 |
| Polymer C | 17.5 | 1,800 | 0 |

*Based on weight of polymer

EXAMPLE 2. EFFECT OF SULFONIC ACID CATALYST LEVEL

Samples are prepared as described in Example 1 except that the level of curing agent is maintained at 17.5 percent based on the weight of the polymer and the level of p-toluenesulfonic acid is varied. The effect of this variation of the sulfonic acid catalyst is shown in the following Table II.

TABLE II
Effect of Catalyst Level

| Sample | Wt. Percent Sulfonic Acid Catalyst* | Voltage at 20% R.H. | Soiling | Durability Rating (No. Washes to exceed 3000 volts) |
|---|---|---|---|---|
| Control | — | 12,000 | — | |
| Polymer A monostearate | 1.0 | 1,700 | −2 | 1 |
| " | 1.2 | 1,500 | −2 | 2 |
| " | 1.4 | 1,300 | −1 | 2 |
| " | 1.6 | 1,100 | 0 | 3 |
| " | 1.8 | 1,300 | 0 | 3 |
| " | 2.0 | 1,500 | 0 | 2 |
| Polymer B | 1.6 | 2,000 | 0 | — |
| Polymer C | 1.6 | 1,800 | 0 | — |

*Based on weight of polymer

EXAMPLE 3. EFFECT OF ANTISTAT POLYMER ADD-ON LEVEL

Samples are prepared as described in Example 1 from Polymer A monostearate except that the level of p-toluenesulfonic acid is kept at 1.6 percent and the level of curing agent is maintained at 17.5 percent, both based on the weight of the polymer, and the level of polymer add-on to the carpet sample is varied. The effect of this variation is shown in the following Table III on both a 30 oz/yd$^2$ (1,020 g/m$^2$) face weight carpet and a 70 oz/yd$^2$ (2,380 g/m$^2$) carpet.

TABLE III
Effect of Antistat Polymer Add-On Level

| Carpet Face Weight oz/yd$^2$ | Add-On oz/yd$^2$ | Voltage at 20% R.H. | Soiling | Durability Rating | Comments |
|---|---|---|---|---|---|
| 30 | 0.05 | 1,600 | −1 | 1 | |
| " | 0.1 | 1,200 | 0 | 2 | |
| " | 0.2 | 1,100 | 0 | 3 | |
| " | 0.3 | 1,000 | 1 | 4 | |
| " | 0 (Control) | 12,000 | — | — | |
| 70 | 0.2 | 2,600 | 0 | — | Handle unaffected |
| " | 0.3 | 1,800 | 0 | — | Handle unaffected |
| " | 0 (Control) | 13,000 | — | — | |

EXAMPLE 4. MISCELLANEOUS TESTS

Samples are prepared as described in Example 1 from Polymer A monostearate with 1.6 percent p-toluenesulfonic acid, 17.5 percent Cymel 380 brand resin at 0.2 oz/yd$^2$ add-on level. They are compared to untreated controls after 150 hours exposure to a UV light source and found to be unaffected. They are visually compared to controls after 3, 6, 9 and 12 months exposure to normal room conditions of temperature, humidity and light and found to be equivalent in appearance. Samples are prepared as described above on several brightly colored carpets and visually compared to controls for any change in luster or color. No change is detected. Samples are exposed to 73 percent relative humidity at about 40° C. for 3 days after which time no change in handle is detected. Samples and controls are soiled and then cleaned with Glory brand rug cleaner. The samples clean as easily as the controls.

Films of the Polymer A monostearate, 1.6 percent acid and 17.5 percent Cymel 380 brand resin are cast on glass plates and subjected to 100° C. in an oven. Only slight discoloration occurs after two weeks.

EXAMPLE 5. ADDITION OF CARBOXYLATED POLYSTYRENE LATEX

Samples of carpet are treated with Polymer B, Polymer C and Polymer A monostearate, all with 1.6 percent p-toluenesulfonic acid and 17.5 percent Cymel 380 brand resin at about 0.2 oz/yd$^2$ add-on of the antistat polymer. To the aqueous solution of the antistat polymer, acid catalyst and curing agent is added a poly(styrene/acrylic acid) latex (98/2 by wt.) of about 300 Angstroms particle size in an amount of about 20 percent latex based on the polymer solids, by weight. The samples are cured as previously described and are tested for voltage and soiling. A slight decrease in voltage is detected and slightly better soiling is noted compared to the same treated samples without the latex.

Each of the invention-treated samples described in the above examples shows softness equal to or better than untreated controls. In contrast, most commercial antistat formulations that attain about the same voltage levels either exhibit harsh handle or increased soiling when compared to the invention-treated samples.

We claim:

1. A topical antistatic composition for use on a textile to impart antistatic properties thereto, said composition comprising:
   (a) a polymer of less than about 20,000 molecular weight consisting essentially of units of the formula:

—CH$_2$CHRO— wherein about 10 percent to 99 percent of the units R is H, CH$_3$ or C$_2$H$_5$, in about 1 percent to 90 percent R is CH$_2$OH, and in about 0 percent to 15 percent R is R'COOCH$_2$, wherein R'CO is the acyl radical of a fatty acid of about 2 to 20 carbon atoms or a polycarboxylic acid,
   (b) a melamine-formaldehyde curing agent for said polymer having a plurality of groups reactive with primary hydroxyl groups, and
   (c) a sulfonic acid catalyst that catalyzes the reaction between the polymer and the curing agent, wherein component (b) is present in the amount of about 15 to about 25 percent, and component (c) is present in the amount of about 1.2 to about 2.2 percent, based on the weight of component (a).

2. The composition of claim 1 wherein the catalyst is toluenesulfonic acid.

3. The composition of claim 1 wherein at least one —CH$_2$CHRO— unit, R is R'COOCH$_2$.

4. The composition of claim 1 wherein R is not R'COOCH$_2$ in any occurrence.

5. The composition of claim 1 wherein component (b) is present in the amount of about 17 to about 22 percent and component (c) is present in the amount of about 1.6 to about 1.8 percent.

6. The composition of claim 1 wherein R is H in about 90 percent of the units and R is CH$_2$OH in about 10 percent of the units.

7. A process for reducing the tendency of a textile to accumulate an electric charge comprising:
   (a) applying to the textile a polymer of less than about 20,000 molecular weight consisting essentially of units of the formula:

—CH$_2$CHRO— wherein about 10 percent to 99 percent of the units R is H, CH$_3$ or C$_2$H$_5$, in about 1 percent to 90 percent R is CH$_2$OH and in about 0 percent to 15 percent R is R'COOCH$_2$, wherein R'CO is the acyl radical of a fatty acid of about 2 to 20 carbon atoms or a polycarboxylic acid; in admixture with about 15 to about 25 weight percent of a melamine-formaldehyde curing agent and about 1.2 to about 2.2 weight percent of a sulfonic acid catalyst, both based on the polymer, and (b) curing said polymer on the textile by heating.

8. The process of claim 7 wherein about 1.6 to about 1.8 percent of the sulfonic acid is present.

9. The process of claim 7 wherein about 17 to about 22 percent of the curing agent is present.

10. The process of claim 7 wherein the catalyst is toluenesulfonic acid.

11. The process of claim 10 wherein about 1.6 to about 1.8 percent toluenesulfonic acid is present and about 17 to about 22 percent melamine-formaldehyde is present and in about 90 percent of the units in the polymer R is H and in about 9 to 10 percent R is CH$_2$OH and the polymer has a molecular weight of about 5,000.

12. The process of claim 7 wherein the textile is carpet.

13. A textile article produced by the process of claim 7.